United States Patent [19]

Moelants et al.

[11] 4,266,014
[45] May 5, 1981

[54] PHOTOGRAPHIC MATERIALS CONTAINING LIGHT ABSORBING METHINE DYES

[75] Inventors: Felix J. Moelants, Wilrijk; Henri Depoorter, Mortsel, both of Belgium

[73] Assignee: Agfa-Gevaert, N.V., Mortsel, Belgium

[21] Appl. No.: 121,736

[22] Filed: Feb. 15, 1980

[30] Foreign Application Priority Data

Mar. 2, 1979 [GB] United Kingdom ................ 7440/79

[51] Int. Cl.³ .............................................. G03C 1/84
[52] U.S. Cl. ..................................... 430/522; 542/444
[58] Field of Search ........................ 430/522; 542/444

[56] References Cited

U.S. PATENT DOCUMENTS

| | | | |
|---|---|---|---|
| 3,512,983 | 5/1970 | Watanabe et al. | 430/522 |
| 3,865,817 | 2/1975 | Kobayaski et al. | 430/522 |
| 3,876,429 | 4/1975 | Poppe et al. | 430/522 |

*Primary Examiner*—Jack P. Brammer
*Attorney, Agent, or Firm*—A. W. Breiner

[57] ABSTRACT

Light-absorbing fluorine-containing 2-pyrazolin-5-one methine oxonol dyes corresponding to the formula

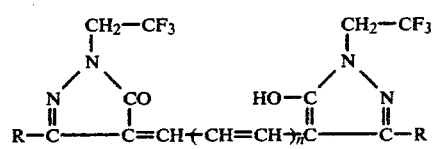

wherein R is $C_1$–$C_5$ alkyl, aryl, alkoxycarbonyl, carboxy, or carbamoyl, and n is 0, 1, or 2.

The dyes can be used in light-sensitive silver halide materials in an antihalation layer, in a filter layer or as screening dyes in a light-sensitive layer. They manifest great stability while in dissolved state within a very large pH-range and they are decolorized easily in one of the processing baths. They are prepared by joining 2 appropriately substituted pyrazolone rings in 4-position by 1 methine group through reaction with an ester of an orthocarboxylic acid or by a tri- or pentamethine group through reaction with β-anilinoacrolein anil HCl or glutaconic dialdehyde dianil HCl respectively.

6 Claims, No Drawings

PHOTOGRAPHIC MATERIALS CONTAINING LIGHT ABSORBING METHINE DYES

The present invention relates to new methine dyes and to their use as light-absorbing dyes in a photographic material.

It is known to incorporate for many purposes light-absorbing dyes into photographic materials. Such light-absorbing dyes can be used as filter dye in a layer coated over one or more light-sensitive emulsion layers or between two emulsion layers e.g. differently colour-sensitized emulsion layers, to protect the underlying light-sensitive emulsion layer(s) from the action of light of a wavelength range absorbed by such light-absorbing dye; as screening dye in a light-sensitive emulsion layer itself; or as antihalation dye in a layer not containing a light-sensitive substance and known as antihalation layer, situated on any of the sides of the support carrying the light-sensitive emulsion layer(s).

Light-absorbing dyes should meet severe demands in order to be useful in photographic materials. They should not affect the inherent sensitivity or spectral sensitization of the light-sensitive emulsions, with which they may come into contact. They should have good absorption characteristics and should not give rise to fogging. Further they should be readily rendered ineffective i.e. decolourized or destroyed and removed in at least one of the photographic processing liquids. It is also desirable that they are sufficiently non-wandering i.e. that they do not substantially diffuse from the layers or coatings in which they had been incorporated, to other layers or coatings e.g. from a filter layer or from an antihalation layer to a silver halide emulsion layer, either during the manufacture, the storage, or the processing of the photographic material.

Numerous compounds have been employed as light-absorbing dyes for the purposes given above. Many of them adversely affect the sensitivity of the light-sensitive emulsions with which they come into contact and others are unsuitable for certain applications in that they are not easily discharged or incompletely discharged in the processing solutions.

Among the light-absorbing dyes that have been proposed for use in photographic materials the pyrazolone-oxonols are well known representatives. In the Belgian Patent Specification No. 850,162 filed Jan. 7, 1977 by Agfa-Gevaert AG, the use is described of a combination of a light-absorbing 2-pyrazolin-5-one monomethine oxonol dye and a 2-pyrazolin-5-one pentamethine oxonol dye.

The present invention provides novel methine dyes that can be used as light-absorbing dyes in photographic materials, which methine dyes manifest great stability while in dissolved state within a very large pH-range so that they can be stored for a long time in dissolved state, and which dyes are decolourized easily in one of the photographic processing liquids.

According to the invention a new class of light-absorbing fluorine-containing 2-pyrazolin-5-one methine oxonol dyes have been found, which correspond to the following general formula:

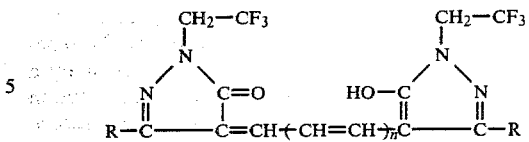

wherein:
R represents
a $C_1$–$C_5$ alkyl group e.g. methyl,
an aryl group or a substituted aryl group e.g. phenyl or phenyl substituted with nitro, or sulpho,
an alkoxycarbonyl group,
a carboxy group, or
a carbamoyl group, and
n is 0, 1, or 2.

The present invention also provides the use of the dyes corresponding to the above general formula as light-absorbing dyes in a photographic material comprising a support, at least one light-sensitive silver halide emulsion layer, and a layer containing a said dye.

Representative examples of light-absorbing dyes for use according to the present invention are given in the following table 1. Reference is made therein to the general formula mentioned hereinbefore.

TABLE 1

| light-absorbing dye | R | n |
|---|---|---|
| 1 | —CH$_3$ | 2 |
| 2 | phenyl | 2 |
| 3 | NO$_2$-phenyl | 2 |
| 4 | SO$_3$H-phenyl | 2 |
| 5 | —COOC$_2$H$_5$ | 2 |
| 6 | —COOH | 2 |
| 7 | —CONH$_2$ | 2 |
| 8 | —CH$_3$ | 1 |
| 9 | phenyl | 1 |
| 10 | NO$_2$-phenyl | 1 |
| 11 | SO$_3$H-phenyl | 1 |
| 12 | —COOC$_2$H$_5$ | 1 |
| 13 | —COOH | 1 |
| 14 | —CONH$_2$ | 1 |
| 15 | —CH$_3$ | 0 |
| 16 | phenyl | 0 |
| 17 | NO$_2$-phenyl | 0 |
| 18 | SO$_3$H-phenyl | 0 |
| 19 | —COOC$_2$H$_5$ | 0 |
| 20 | —COOH | 0 |
| 21 | —CONH$_2$ | 0 |

As is illustrated by the following preparations, the dyes of the invention can be prepared by joining two appropriately substituted pyrazolone rings in their 4-position either by one methine group through the reaction with an ester of an orthocarboxylic acid or by a trimethine or pentamethine group through the reaction with β-anilinoacrolein anil hydrochloride or glutaconic dialdehyde dianil hydrochloride respectively.

The substituted pyrazolone starting products can be prepared as described hereinafter from benzenesulphochloride and 2,2,2-trifluoroethanol, thus forming 2,2,2-trifluoroethylbenzene sulphonate, which is made to react with hydrazine hydrate to form 2,2,2-trifluoroethylhydrazine hydrate. By hot condensation of the resulting hydrazine derivative with an appropriately substituted ester of an acylacetic acid, pyrazolones are obtained.

Preparation 1: dye 3

(a) 2,2,2-trifluoroethylbenzene sulphonate 4.4 Moles of a 30% aqueous solution of sodium hydroxide were dissolved in 4 moles of 2,2,2-trifluoroethanol with cooling to maintain the temperature of the reaction mixture between 50° and 55° C. The solution was added at once with stirring at the same temperature to a mixture of 4.2 moles of benzene sulphochloride and 1 liter of water, which had also been brought at 50°–55° C. After 10 min of stirring the oil layer was decanted and washed with 1 liter of water. The oil was filtered through paper to remove water drops.
Yield: 96.5%. Analysis by gas chromatography: 98.5%.

(b) 2,2,2-trifluoroethylhydrazine hydrate

Whilst stirring 1 mole of boiling hydrazine hydrate, 1 mole of 2,2,2-trifluoroethylbenzene sulphonate and 3.7 moles of hydrazine hydrate were allowed to flow in simultaneously at such a rate that a normal destillation took place at 97° C. After the addition destillation was continued until a boiling point of 125° C. was reached.
Yield: 90%.

(c) 1-(2',2',2'-trifluoroethyl)-3-(m-nitrophenyl)-2-pyrazolin-5-one 0.15 Mole (35.6 g) of m-nitrobenzoyl acetic acid ethyl ester and 0.15 mole (25.2 g) of 2,2,2-trifluoroethyl hydrazine hydrate were stirred together for 2 hours in 90 ml of boiling acetic acid. Subsequently, the reaction mixture was poured out in water. After stirring and filtration, the precipitate was recrystallized from methanol.
Yield: 34 g (79%). Melting point: 75° C.

(d) dye 3: bis-1,5-[1-(2',2',2'-trifluoroethyl)-3-(m-nitrophenyl)-2-pyrazolin-5-one]pentamethine oxonol 0.05 Mole (16.6 g) of 1-(2',2',2'-trifluoroethyl)-3-(m-nitrophenyl)-2-pyrazolin-5-one and 0.025 mole (7.11 g) of glutaconic dialdehyde dianil hydrochloride were stirred for 5 minutes in 50 ml of dimethylformamide. 0.2 Mole (28 ml) of triethylamine were added to the mixture and stirring was continued for 1 hour at room temperature. Subsequently, the reaction mixture was poured out on 250 ml of water, 50 ml of 25% sodium chloride and 23 ml of concentrated hydrochloric acid. The mixture was stirred, left standing for a time, and filtered. The dye obtained was washed with highly diluted hydrochloric acid.
Yield: 10 g.

Preparation 2: dye 4

(a) and (b) as described in preparation 1 hereinbefore.

(c) 1-(2',2',2'-trifluoroethyl)-3-(p-sulphofluoride phenyl)-2-pyrazolin-5-one 0.1 Mole (26 g) of p-fluorosulphonyl benzoyl acetic acid methyl ester and 0.1 mole (16.8 g) of 2,2,2-trifluoroethylhydrazine hydrate were stirred together for 3 hours and boiled in 100 ml of acetic acid. The mixture was poured out on water. After filtration the precipitate was recrystallized from benzene.
Yield: 26 g. Melting point: 152° C.

(d) 1-(2',2',2'-trifluoroethyl)-3-(p-sulphophenyl)-2-pyrazolin-5-one 0.05 Mole (18 g) of 1-(2',2',2'-trifluorophenyl)-3-(p-fluorosulphonylphenyl)-2-pyrazolin-5-one were dissolved in 75 ml of hot ethanol. 0.15 Mole (25 ml) of 6 N sodium hydroxide were added dropwise with stirring to the solution. The mixture was stirred for 1 hour at boiling temperature. The reaction mixture, while still hot, was then acidified with 0.15 mole (25 ml) of 6 N hydrochloric acid. The sodium chloride formed was filtered and the filtrate was distilled off in vacuo. The residue was recrystallized twice from methanol.
Yield: 7 g. Melting point: >250° C.

(e) dye 4: bis-1,5-[1-(2',2',2'-trifluoroethyl)-3-(p-sulphophenyl)-2-pyrazolin-5-one]pentamethine oxonol 0.1 Mole (35.4 g) of 1-(2',2',2'-trifluoroethyl)-3-(p-sulphophenyl)-2-pyrazolin-5-one were stirred in 100 ml of dimethylformamide. Successively, 0.4 mole (56 ml) of triethylamine and 0.05 mole (14.2 g) of glutaconic dialdehyde dianil hydrochloride were added. The reaction mixture was stirred for 1 hour at 75° C. and then poured out on 500 ml of 5% sodium chloride in water and 45 ml of concentrated hydrochloric acid. The dye was filtered off and washed twice with 5% sodium chloride in water.
Yield: 28 g.

Preparaion 3: dye 7

(a) and (b) as described in preparation 1 hereinbefore.

(c) 1-(2',2',2'-trifluoroethyl)-3-carbethoxy-2-pyrazolin-5-one

1 Mole (221 g) of the sodium salt of oxalacetic diethyl ester and 1 mole (224 g) of 2,2,2-trifluoroethylhydrazine hydrate were stirred for 1 hour in 1 l of boiling acetic acid. The mixture was poured out on water and stirred. The product melting at 171° C. was filtered with suction.
Yield: 169 g.

(d) 1-(2',2',2'-trifluoroethyl)-3-carbamoyl-2-pyrazolin-5-one 0.71 Mole (169 g) of 1-(2',2',2'-trifluoroethyl)-3-carbethoxy-2-pyrazolin-5-one were stirred for 8 hours in concentrated ammonium hydroxide and left standing afterwards for 5 days in a sealed recipient at room temperature. After filtration the filtrate obtained was poured out on ice and acidified with hydrochloric acid. As soon as the product had crystallized out completely, it was filtered and washed with water.

Yield: 147 g. Melting point: 222° C.

(e) dye 7:
bis-1,5-[1-(2',2',2'-trifluoroethyl)-3-carbamoyl-2-pyrazolin-5-one]pentamethine oxonol 0.1 Mole (21.4 g) of 1-(2',2',2'-trifluoroethyl)-3-carbamoyl-2-pyrazolin-5-one and 0.05 mole (14.2 g) of glutaconic dialdehyde dianil hydrochloride were stirred together for 5 min at room temperature in 200 ml of dimethylformamide. 0.4 Mole (56 ml) of triethylamine were added whereupon the whole was stirred for 1 hour. Subsequently, 10 ml of acetic anhydride were added and stirring was continued for another 3 hours at room temperature. The mixture was then poured out in 1 liter of water and 45 ml of concentrated hydrochloric acid, stirred for 15 min, and left standing for 2 hours. Next, the dye obtained was filtered and washed twice with 250 ml of 0.01 N hydrochloric acid.

Yield: 22.9 g.

Preparation 4: dye 9

(a) and (b) as described in preparation 1 hereinbefore.

(c) 1-(2',2',2'-trifluoroethyl)-3-phenyl-2-pyrazolin-5-one 0.75 Mole (144 g) of benzoylacetic acid ethyl ester and 0.75 mole (126 g) of 2,2,2-trifluoroethylhydrazine hydrate were stirred for 3 hours in 900 ml of boiling acetic acid. The reaction mixture was poured out on 9 l of water. After 1 hour of stirring at room temperature the pyrazolone derivative was filtered and recrystallized from methanol.

Yield: 155 g. Melting point: 150° C.

(d) dye 9:
bis-1,3-[1-(2',2',2'-trifluoroethyl)-3-phenyl-2-pyrazolin-5-one]trimethine oxonol 0.05 Mole (12.2 g) of 1-(2',2',2'-trifluoroethyl)-3-phenyl-2-pyrazolin-5-one and 0.025 mole (6.5 g) of β-anilino-acrolein anil hydrochloride were stirred in 75 ml of acetonitrile. 8 ml of triethylamine were added and the mixture was refluxed for 10 min. 5 ml of acetic anhydride were added and refluxing was continued for 30 min. Subsequently, the solution was cooled and poured out in 300 ml of 12% aqueous sodium chloride. The crystallizing dye was filtered off and rinsed with water. After drying the dye was recrystallized from acetone/n-hexane.

Yield: 9 g.

Preparation 5: dye 12

(a) and (b) as described in preparation 1 hereinbefore.
(c) as described in preparation 3 hereinbefore.

(d) dye 12:
bis-1,3-[1-(2',2',2'-trifluoroethyl)-3-carbethoxy-2-pyrazolin-5-one]trimethine oxonol 0.15 Mole (35.7 g) of 1-(2',2',2'-trifluoroethyl)-3-carbethoxy-2-pyrazolin-5-one were stirred in 150 ml of dimethylformamide. Successively, 0.6 mole (84 ml) of triethylamine and 0.075 mole (1 g) of β-anilino-acrolein anil hydrochloride were added. The mixture was stirred for 30 min at 70°-75° and after having been cooled, poured out on 750 ml of 5% aqueous sodium chloride and 69 ml of concentrated hydrochloric acid. After filtration the dye was rinsed twice with 0.01 N hydrochloric acid.

Yield: 35 g.

Preparation 6: dye 15

(a) and (b) as described in preparation 1 hereinbefore.

(c) 1-(2',2',2'-trifluoroethyl)-3-methyl-2-pyrazolin-5-one 0.25 Mole (32.5 g) of ethyl acetoacetate and 0.25 mole (42 g) of 2,2,2-trifluoroethylhydrazine hydrate were stirred and refluxed for 2 hours in 125 ml of acetic acid. The acetic acid was distilled off in vacuo. The distillation residue was rubbed with water and recrystallized from methanol.

Yield: 31 g. Melting point: 138° C.

(d) dye 15:
bis-[1-(2',2',2'-trifluoroethyl)-3-methyl-2-pyrazolin-5-one]monomethine oxonol 0.03 Mole (5.7 g) of 1-(2',2',2'-trifluoroethyl)-3-methyl-2-pyrazolin-5-one and 30 ml of ethyl orthoformate were refluxed for 45 min. The liquid was distilled off in vacuo and the solid residue was recrystallized from methanol.

Yield: 4 g.

Preparation 7: dye 20

(a) and (b) as described in preparation 1 hereinbefore.
(c) 1-(2',2',2'-trifluoroethyl)-3-carbethoxy-2-pyrazolin-5-one was prepared as described in preparation 3 (c) hereinbefore.

(d)
1-(2',2',2'-trifluoroethyl)-3-carboxy-2-pyrazolin-5-one 0.38 Mole (100 g) of 1-(2',2',2'-trifluoroethyl)-3-carbethoxy-2-pyrazolin-5-one were stirred for 1 hour at 90°-95° C. in 900 ml of 1 N sodium hydroxide. The mixture was acidified to pH 1 with concentrated hydrochloric acid and left standing overnight. The precipitate formed was filtered off and rinsed with water Yield: 77 g. Melting point: >250° C.

(e) dye 20:
bis-[1-(2,2',2'-trifluoroethyl)-3-carboxy-2-pyrazolin-5-one]monomethine oxonol 0.02 Mole (4.3 g) of 1-(2',2',2'-trifluoroethyl)-3-carboxy-2-pyrazolin-5-one were boiled for 1 hour in 20 ml of dimethylformamide, 6 ml of ethyl formate, and 4.2 ml of triethylamine. The reaction mixture was pouredout in 100 ml of water and 4 ml of concentrated hydrochloric acid. The dye formed was filtered off and rinsed with 0.01 hydrochloric acid.

Yield: 3 g.

The other dyes ca be prepared in a similar way. The length of the methine chain can be adjusted as described hereinbefore.

The absorption characteristics (measured by dimethylformamide (DMF)) of the representative dyes according to the present invention are listed in the following table. The extinction coefficient of the dye is givn as well.

TABLE 2

| Dye no. | Absorption maximum (mm) in DMF | $\epsilon \cdot 10^{-4}$ |
|---|---|---|
| 1 | 638 | 7.76 |
| 2 | 658 | 9.17 |
| 3 | 666 | 12.3 |

TABLE 2-continued

| Dye no. | Absorption maximum (mm) in DMF | $\epsilon \cdot 10^{-4}$ |
| --- | --- | --- |
| 4 | 666 | 12.3 |
| 5 | 668 | 13.0 |
| 6 | 662 | 6.07 |
| 7 | 660 | 13.4 |
| 8 | 536 | 6.10 |
| 9 | 552 | 6.24 |
| 10 | 558 | 4.39 |
| 11 | 537 | 5.37 |
| 12 | 564 | 6.14 |
| 13 | 564 | 3.51 |
| 14 | 560 | 7.99 |
| 15 | 460 | 2.52 |
| 16 | 466 | 2.22 |
| 17 | 480 | 2.03 |
| 18 | 478 | 1.90 |
| 19 | 478 | 2.58 |
| 20 | 472 | 2.57 |
| 21 | 474 | 2.18 |

The dyes according to the invention can be used in any photographic material comprising light-sensitive silver halide, whenever easily dischargeable dyestuffs are desired or needed. The dyes are particularly suitable for use in an antihalation layer coated at the side of the support that carries the light-sensitive silver halide emulsion layer(s). They can also be used successfully as filter dye in a colloid filter layer of a light-sensitive photographic multilayer material e.g. a colour material, shielding at least one optically sensitized silver halide emulsion layer from the light of the wavelength absorbed by said dye, or as screening dye in a light-sensitive silver halide emulsion layer itself. Said dyestuffs when used as screening dye in a light-sensitive silver halide emulsion layer do not or almost not decrease the inherent sensitivity and/or spectral sensitization of the silver halide. The hydrophilic colloid binder of these layers containing a dye according to the present invention is usually gelatin. Other hydrophilic colloids such as casein, polyvinyl alcohol, poly-N-vinyl pyrrolidine, sodium alginate, sodium carboxymethylcellulose can be used as well.

The dyes according to the present invention can also be used in an antihalation layer coated at the side of the support opposite to that carrying the light-sensitive silver halide emulsion layer(s) e.g. antihalation layers containing a water-insoluble, alkali-soluble polyeric binder applied to a hydrophobic film support e.g. polyethylene terephthalate support. More details about water-insoluble, alkali-soluble polymeric binders suitable for this purpose and other features of such antihalation coatings can be found in U.S. Pat. No. 3,863,563 of Henri Depoorter, Felix Jan Moelants, Theofiel Hubert Ghys and August Jean Van Paesschen, issued Dec. 10, 1974 and U.K. Patent Specification No. 1,338,900 filed Feb. 17, 1970 by Gevaert-Agfa N.V. Preferred binders are co(styrene/acrylic acid) and co(vinyl acetate/maleic acid) binders.

The following example illustrates the present invention.

EXAMPLE

Coating solutions of the following composition were prepared:

| | |
| --- | --- |
| inert gelatin | 21.5 g |
| dye listed in the table hereinafter in an amount so as to obtain per sq.m after coating the amount of dye given in said table | |
| Saponine | 0.6 g |
| 4% aqueous solution of formaldehyde | 15 ml |
| water to make | 500 ml |

The solutions were coated on subbed polyester supports in a ratio of 47 g/sq.m, so that 2 g of gelatin were present per sq.m.

Antihalation layers were obtained, the absorption characteristics of which are given in the following table.

All these layers were fully discoloured during conventional black-and-white or colour processing.

TABLE 3

| Dye no. | mg/sq.m | Absorption maximum in nm | Optical density at λmax |
| --- | --- | --- | --- |
| 1 | 200 | 625 | 1.80 |
| 4 | 200 | 645 | 1.40 |
| 5 | 200 | 610–645 | 1.70 |
| 6 | 200 | 615–645 | 1.75 |
| 7 | 200 | 500–653 | 0.60–1.35 |
| 8 | 100 | 522 | 1.40 |
| 11 | 300 | 544 | 1.80 |
| 12 | 300 | 530–555 | 1.55 |
| 13 | 300 | 545 | 1.80 |
| 14 | 200 | 550 | 1.70 |
| 15 | 300 | 420 | 0.17 |
| 19 | 300 | 470 | 0.87 |

It was found that these dyes cause an extremely weak desensitization and thus give rise only to the reduction in speed that is necessarily connected with the specific absorption of these dyes.

We claim:

1. A light-sensitive photographic material containing a light-absorbing dye corresponding to the following general formula:

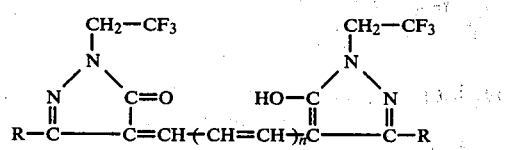

wherein:
R represents a $C_1$–$C_5$ alkyl group, an aryl group or a substituted aryl group, an alkoxycarbonyl group, a carboxy group, or a carbamoyl group, and
n is 0, 1, or 2 and a silver halide emulsion.

2. A material according to claim 1, comprising a support, at least one light-sensitive silver halide emulsion layer and a layer containing said light-absorbing dye.

3. A material according to claim 2, wherein the layer containing said light-absorbing dye is a hydrophilic colloid antihalation layer coated at the side of the support that carries the light-sensitive silver halide emulsion layer(s).

4. A material according to claim 2, wherein the support is a film support and the layer containing said light-absorbing dye is an antihalation layer coated at the side of the support opposite to that carrying the light-sensitive silver halide emulsion layer(s) and containing a water-insoluble, alkali-soluble polymeric binder.

5. A material according to claim 2, wherein the layer containing said light-absorbing dye is a colloid filter layer of a light-sensitive photographic multi-layer material shielding at least one typically sensitized silver halide emulsion layer from the light of the wavelength absorbed by said light-absorbing dye.

6. A material according to claim 2, wherein the layer containing said light-absorbing dye is a light-sensitive silver halide emulsion layer.

* * * * *